United States Patent [19]

Adaway et al.

[11] Patent Number: 4,525,496
[45] Date of Patent: Jun. 25, 1985

[54] SELF-INVERTING WATER-IN-OIL EMULSIONS OF WATER-SOLUBLE POLYMERS

[75] Inventors: Timothy J. Adaway; Harold G. Fravel, Jr., both of Midland; James P. Easterly, Jr., Bay City, all of Mich.

[73] Assignee: The Dow Chemical Company, Midland, Mich.

[21] Appl. No.: 284,296

[22] Filed: Jul. 17, 1981

[51] Int. Cl.³ ............................................. G21K 1/10
[52] U.S. Cl. .................................... 523/337; 524/80; 524/555
[58] Field of Search ................ 260/29.6 BE, 29.6 TA; 523/337; 524/80, 555

[56] References Cited

U.S. PATENT DOCUMENTS

| | | | |
|---|---|---|---|
| 3,806,485 | 4/1974 | Frisque | 523/337 |
| 3,979,349 | 9/1976 | Fink et al. | 260/29.6 WB |
| 4,022,731 | 5/1977 | Schmitt | 260/29.6 E |
| 4,077,930 | 3/1978 | Liu et al. | 260/29.6 TA |
| 4,147,681 | 4/1979 | Liu et al. | 260/29.6 TA |
| 4,152,307 | 5/1979 | Shibahara et al. | 260/29.6 HN |

*Primary Examiner*—Joseph L. Schofer
*Assistant Examiner*—N. Sarofim

[57] ABSTRACT

A water-in-oil emulsion of a water-soluble polymer such as acrylamide/acrylic acid copolymer having improved invertibility is prepared by (1) adding a portion of an inverting surfactant such as sorbitan trioleate having 20 polyoxyethylene units to a water-in-oil emulsion of water-soluble monomer, (2) polymerizing the monomer and (3) adding a remaining amount of inverting surfactant to the emulsion.

15 Claims, No Drawings

SELF-INVERTING WATER-IN-OIL EMULSIONS OF WATER-SOLUBLE POLYMERS

BACKGROUND OF THE INVENTION

This invention relates to self-inverting water-in-oil emulsions of water-soluble polymers wherein emulsions invert immediately upon the addition of sufficient water. This invention also relates to processes for preparing such emulsions.

Various water-soluble polymers such as polyacrylamide and copolymers of acrylamide with other monomers are well-known to be effective flocculants for many substrates including sewage, cellulosic fibers and fines for retention and freeness, metal or treatment, plating waste, coal tailings, and the like. Such polymers are also known to exhibit superior thickening properties when said polymers are dissolved in aqueous media. Particularly well-known for this purpose are the anionic carboxamide polymers such as acrylamide/acrylic acid copolymers, including those prepared by hydrolysis of polyacrylamide. Such polymers are very useful as fluid mobility control agents in enhanced oil recovery processes.

In the past, such polymers have been made available commercially as powders or finely divided solids which must be subsequently dissolved in an aqueous medium in order to be used. Because such dissolution steps are sometimes time consuming and often require rather expensive mixing equipment, it has become a common practice to formulate the water-soluble polymer in a water-in-oil emulsion wherein the polymer is dissolved in the dispersed aqueous phase. Such emulsions, a well as a method for preparing them, are described in U.S. Pat. No. 3,284,393 to Vanderhoff et al. Unfortunately for many applications, these emulsions do not invert as readily as desired. In order to accelerate the inversion rate of such emulsions, it has been a common practice, e.g., as shown in U.S. Pat. No. Re. 28,474, to add a water-soluble surfactant just prior to inversion. While the addition of an inverting surfactant in this manner does increase the rate of inversion, the resulting emulsions often do not exhibit the activity or ability to pass through porous structures (so-called screen factor or filterability) that is desired for fluid mobility control agents. More importantly, it is found that such practices are generally not satisfactory when it is necessary to invert the emulsion in aqueous medium containing dissolved salts as is often the case for enhanced oil recovery practices.

In view of the foregoing deficiencies of conventional emulsions and methods for inverting them, it is highly desirable to provide a self-inverting water-in-oil emulsion that will invert quickly into an aqueous medium that may contain significant quantities of dissolved salts. It is also desirable to provide an emulsion that has a reduced oil content and increased polymer solids.

SUMMARY OF THE INVENTION

The present invention is such an emulsion that comprises (1) a discontinuous aqueous phase containing a water-soluble polymer which aqueous phase is dispersed as colloidal-sized particles or droplets in (2) a continuous oil phase wherein the emulsion contains an inverting amount of an inverting surfactant and an emulsifying amount of a water-in-oil emulsifier. By an "inverting amount" is meant that the amount of inverting surfactant is such that the water-in-oil emulsion will invert in a reasonably short period of time when the emulsion is combined with sufficient water. In the emulsion of this invention, it is critical that (1) at least a portion of the inverting surfactant be added at some point prior to the completion of polymerization and (2) at least a portion of the inverting surfactant be added to the emulsion after polymerization, but prior to inversion.

In another aspect, the present invention is a method for preparing the aforementioned emulsion which comprises (1) forming a stable water-in-oil emulsion (monomeric precursor) containing at least one water-soluble monomer in the aqueous phase which is dispersed in a continuous oil phase, said emulsion containing an emulsifying amount of a water-in-oil emulsifier and an amount of an inverting surfactant that is sufficient to increase the degree of inversion when the emulsion of water-soluble polymer is inverted, but less than that which destabilizes the monomeric precursor or the emulsion of polymer; (2) subjecting the monomeric precursor to conditions to polymerize the monomer; and (3) adding a remaining amount of inverting surfactant which will enable the resulting water-in-oil emulsion of water-soluble polymer to invert upon the addition of sufficient water. Surprisingly, it is found that, by having a portion of the inverting surfactant present in the monomeric precursor prior to polymerization and by adding an additional portion of the inverting surfactant to the emulsion subsequent to polymerization, an emulsion is obtained which is superior to emulsions obtained by either adding all of the inverting surfactant to the monomeric precursor prior to polymerization or by adding all of the inverting surfactant to the emulsion subsequent to the polymerization. The emulsions of this invention are superior to conventional emulsions in that they have increased polymer solids, reduced oil content, lower bulk viscosity and less inverting surfactant than is employed in conventinal emulsions. These emulsions, although self-inverting upon the addition of water, are stable in that they can be stored for long periods of time and/or can undergo several freeze-thaw cycles without irreversible coagulation or precipitation. Most surprising is the ability of such emulsions to invert readily into aqueous media containing substantial quantities, e.g., from about 0.0001 to about 20 weight percent, of dissolved salts which are commonly present in subterranean brines.

In addition to their utility as drilling muds, fracturing fluids, and fluid mobility control agents in oil recovery methods, the emulsions of the present invention are also useful as flocculating agents for sewages, industrial wastes, mining streams such as coal slurries and mining effluents, gas thickeners for coating formulations and as additives for the manufacture of paper.

DETAILED DESCRIPTION OF THE ILLUSTRATIVE EMBODIMENTS

The present invention is practiced in the preparation of water-in-oil emulsions of any water-soluble polymer. Such emulsions are those wherein the dispersed phase is an aqueous phase having dissolved therein a water-soluble polymer and the continuous oil phase is a water-immiscible inert organic liquid. The ratio of the aqueous phase to the oil phase is suitably any ratio that permits the formation of a water-in-oil emulsion. Preferably, however, based on the total weight of the water-in-oil emulsion, the disperse phase constitutes from about 50 to about 90, more preferably from about 65 to about 80, weight percent of the emulsion. The continuous oil phase preferably constitutes from about 10 to about 50, more preferably from about 20 to about 35, weight percent of the emulsion.

For the purposes of this invention, the water-soluble polymer contained in the aqueous phase of the emulsion is one which forms a thermodynamically stable mixture when combined with water. These mixtures form spontaneously and include true solutions in which the individual polymer molecules are dispersed as well as micellular or colloidal solutions wherein the polymer molecules are aggregated to some extent but wherein such aggregates are no larger than colloidal size. Accordingly, the water-soluble polymers are generally homopolymers and copolymers of water-soluble ethylenically unsaturated monomers.

Suitable water-soluble monomers include those that are sufficiently water-soluble to form at least a 10 weight percent solution when dissolved in water and readily undergo addition polymerization to form polymers that are water-soluble. Exemplary water-soluble monomers include ethylenically unsaturated amides such as acrylamide, methacrylamide and fumaramide; their N-substituted derivatives such as 2-acrylamide-2-methylpropane sulfonic acid (AMPS), N-(dimethylaminomethyl)acrylamide as well as N-(trimethylammoniummethyl)acrylamide chloride and N-(trimethylammoniumpropyl)methacrylamide chloride; ethylenically unsaturated carboxylic acids such as acrylic acid, methacrylic acid, itaconic acid and fumaric acid. Ethylenically unsaturated quaternary ammonium compounds such as vinylbenzyl trimethyl ammonium chloride, sulfoalkyl esters of unsaturated carboxylic acids such as 2-sulfoethyl methacrylate; aminoalkyl esters of unsaturated carboxylic acids such as 2-aminomethyl methacrylate and 2-(N,N-dimethylamino)ethyl methacrylate as well as the quaternized derivatives thereof such as acryloylethyl trimethyl ammonium chloride; vinyl amines such as vinyl pyridine and vinyl morpholine, diallyl amines and diallyl ammonium compounds such as diallyl dimethyl ammonium chloride; vinyl heterocyclic amides such as vinyl pyrrolidone; vinylaryl sulfonates such as vinylbenzyl sulfonate as well as the salts of the foregoing monomers. Of the foregoing water-soluble monomers, acrylamide and combinations of acrylamide and acrylic acid are preferred. Acrylamide and combinations thereof with up to 50 mole percent of other water-soluble monomers, based on total water-soluble monomer, are more preferred. Most preferred are polymers wherein the water-soluble monomer is acrylamide and a mixture of from about 60 to about 99 mole percent of acrylamide with from about 1 to about 40 mole percent of other water-soluble monomers.

The molecular weight of the water-soluble polymer is not particularly critical and may vary over a wide range from about 1 to about 25 million. Preferred polymers have weight average molecular weight in the range from about 2 to about 10 million.

The water-immiscible oil phase of the emulsion generally comprises at least one inert hydrophobic liquid. Usually such liquid is an organic liquid such as a liquid hydrocarbon or substituted hydrocarbon. Preferred organic liquids are the halogenated hydrocarbons such as perchloroethylene, methylene chloride and the like as well as liquid hydrocarbon having from 4 to 15 carbons per molecule including aromatic and aliphatic hydrocarbons and mixtures thereof, e.g., benzene, xylene, toluene, mineral oils, liquid paraffins such as kerosene, naptha and the like. Of the foregoing organic liquids, the hydrocarbons are the more preferred, with aliphatic hydrocarbons being most preferred.

In general, the water-in-oil emulsions of the present invention are prepared by following the general procedure described in the prior art as exemplified in U.S. Pat. Nos. 3,284,393; 3,624,019 and 3,734,873, which are hereby incorporated by reference. In such methods, an aqueous solution of water-soluble, ethylenically unsaturated monomer(s) is dispersed in the inert hydrophobic organic liquid containing a sufficient amount of a water-in-oil emulsifying agent to form a water-in-oil emulsion of the water-soluble monomer (monomeric precursor). At some point prior to or during the polymerization of such monomer, an inverting surfactant is incorporated in an amount that is sufficient to increase the degree of inversion of the emulsion of the water-soluble polymer when the emulsion is subjected to inverting conditions, provided that said amount is less than that which destabilizes the monomeric precursor or the emulsion. In accordance with this invention, the initial portion of inverting surfactant may be added to the monomeric precursor, or it may be added to the aqueous phase or oil phase prior to formation of the monomeric precursor so long as it is present in the monomeric precursor prior to the completion of polymerization. By "degree of inversion" is meant the percentage of polymer that completely dissolves in the aqueous phase upon inversion based on the total polymer that could dissolve. By "destabilizing the emulsion" is meant that the monomeric precursor or the water-in-oil emulsion of water-soluble polymer separates into two phases having a single interface or inverts into an oil-in-water emulsion. Preferably, said amount of inverting surfactant that is added prior to polymerization is in the range from about 0.05 to about 5 percent based on monomer weight, most preferably from about 0.2 to about 2 weight percent. The resulting stable water-in-oil emulsion of monomer is then heated under free-radical forming conditions in order to polymerize the monomer in the dispersed phase to form a water-in-oil emulsion of the water-soluble polymer. Subsequent to polymerization and prior to inversion, this water-in-oil emulsion is combined with additional inverting surfactant which may or may not be the same as the inverting surfactant added prior to polymerization. This post-added inverting surfactant is added in an amount sufficient to cause inversion when the water-in-oil emulsion is combined with sufficient water to form a continuous aqueous phase. Preferably, such post-added amount of inverting surfactant is in the range from about 0.5 to about 10, most preferably from about 3 to about 7, weight percent based on the weight of the polymer.

Emulsifiers suitably employed for purposes of emulsifying the aqueous phase containing the water-soluble monomer in the organic liquid are those emulsifiers that promote the formation and stabilization of water-in-oil emulsions. Normally such emulsifiers have a hydrophilic-lipophilic balance (HLB) in the range from about 2 to about 9, most preferably from about 3 to 6. Preferably, the emulsifying agent is sorbitan monooleate, the reaction product of oleic acid with isopropanolamide or a mixture thereof. Other suitable emulsifying agents include hexadecyl sodium phthalate, decyl sodium phthalate, octadecyl sodium phthalate, sorbitan monooleate, sorbitan stearate, glycerine mono- or distearate and combinations of such emulsifying agents. Generally, the emulsifier is used in amounts sufficient to provide the desired water-in-oil emulsion. This amount is normally in the range from about 0.1 to about 20, preferably from about 3 to about 5, weight percent based on the weight of monomer.

Inverting surfactants suitably employed in the practice of this invention are generally those that promote the formation of oil-in-water emulsions or dispersions when the water-in-oil emulsion is combined with sufficient water to form a continuous aqueous phase. Generally, such inverting surfactants are water-soluble compounds having an HLB in the range from about 6.5 to about 20, preferably from about 10 to about 14. Examples of such inverting surfactants include nonionic, anionic, cationic or amphoteric surfactants with nonionic surfactants being preferred.

Preferred nonionic surfactants include (1) alkyl polyethyleneoxy compounds such as alkyl polyethyleneoxy alcohol represented by the formula:

$$R-(EO)_n-H$$

wherein R is $C_4$-$C_{20}$ alkyl, EO is ethyleneoxy and n is a number from 1 to 10 and (2) nonionic surfactants such as the reaction products of ethylene oxide or mixtures of ethylene oxide and higher alkylene oxide with active hydrogen compounds such as phenols, alcohols, carboxylic acids and amides, e.g., alkylphenoxyethyleneoxy alcohols and alkylphenoxy polyethyleneoxy alcohols.

Also suitable are anionic compounds represented by the formula:

$$R-X$$

wherein R is as defined hereinbefore and X is $SO_3H$, $CO_2H$ or $PO_3H$ and salts thereof. Examples include long chain carboxylates such as potassium oleate, sodium laurate, potassium stearate, potassium caprolate, sodium palmatate and the like; alkali metal alkylbenzene sulfonates such as sodium nonylbenzene sulfonate and potassium dodecylbenzene sulfonate; alkali metal alkyl sulfates such as sodium dodecyl sulfate and alkali metal dialkyl sulfosuccinates such as sodium dihexyl sulfosuccinate and sodium dioctyl sulfosuccinate; salts of resin acids such as abietic acid and dihydroabietic acid.

Also suitable are cationic surfactants such as alkyl ammonium or quaternary ammonium salts, e.g., dodecyl ammonium hydrochloride, dodecyl trimethyl quaternary ammonium chloride and the like, and ethoxylated fatty amines. Other suitable surfactants are described in McCutcheon's *Detergents and Emulsifiers*, North American Edition, 1980 Annual. Also included in the aforementioned surfactants are oligomeric and polymerizable surfactants described at pages 319-322 of Blackley, *Emulsion Polymerization*, Halsted Press (1975). Examples of such oligomers include ammonium and alkali metal salts of functionalized oligomers sold by Uniroyal Chemical under the trade name "Polywet" and copolymers of acrylonitrile and acrylic acid having molecular weights less than 2000 which are prepared in the presence of chain terminating agents such as n-octyl mercaptan. Examples of polymerizable surfactants include sodium salts of 9- and 10-(acryloylamido)stearic acid and the like.

Of the foregoing surfactants, the nonionic types are preferred, with ethoxylated alkyl phenols and ethoxylated fatty alcohols being most preferred.

As mentioned hereinbefore, polymerization of the water-in-oil emulsion of the water-soluble monomers is advantageously effected under conventional conditions such as described in U.S. Pat. No. 3,284,393. Normally such polymerization is practiced in the presence of a polymerization initiator capable of generating free-radicals. Preferably, this free-radical initiator is employed in amounts from about 0.01 to about 0.1 weight percent of initiator based on the monomers. Exemplary polymerization initiators include the inorganic persulfates such as potassium persulfate, ammonium persulfate and sodium persulfate, azo catalysts such as azobisisobutyronitrile and dimethylazoisobutyrate; organic peroxygen compounds such as benzyl peroxide, t-butylperoxide, diisopropylbenzene hydroperoxide and t-butyl hydroperoxide. Of these initiators, the organic types such as t-butyl hydroperoxide are preferred. In addition to the aforementioned ingredients, the emulsion polymerization recipe optionally includes chain transfer agents, chelating agents, buffers, salts, and the like.

The emulsions of this invention are self-inverting in that they invert readily when dispersed into water without adding additional inverting surfactant. They are particularly effective for inversion in aqueous media containing from about 0.001 to about 10, especially from about 0.05 to about 5, weight percent of dissolved salts such as sodium chloride, calcium chloride, magnesium chloride and the like that are normally present in subterranean brines.

The following examples are given to illustrate the invention and should not be construed as limiting its scope. Unless otherwise indicated, all parts and percentages are by weight.

EXAMPLE 1

A water-in-oil emulsion of an acrylamide/acrylic acid copolymer is prepared by dissolving 125 g of acrylamide and 54 g of acrylic acid in 100 g of water. The pH of the resulting aqueous solution is adjusted to 6.5 by the addition of a 50 percent aqueous solution of NaOH. To this solution is added 0.04 g of the pentasodium salt of diethylenetriaminepentaacetic acid and 2 g of a polyethylene glycol ether of a secondary alcohol sold by Union Carbide under the trade name Tergitol 15-S-9. The total weight of this aqueous phase is adjusted to 490 g by the addition of water. This aqueous phase is then dispersed in an oil phase which contains 182 g of liquid hydrocarbon, 4 g of isopropanolamide of oleic acid and 4 g of sorbitan monooleate. The resulting emulsion is placed into a liter glass resin kettle equipped with a stirrer, a nitrogen sparger, a thermometer, a water bath and gas exit. The kettle containing the emulsion is sparged with nitrogen for about 1 hour to remove oxygen. The emulsion is then subjected to polymerization conditions as described in U.S. Pat. No. 3,284,393 to form a water-in-oil emulsion of acrylamide/acrylic acid copolymer. After polymerization, 90 g of an aqueous solution of 16 g of $Na_2CO_3$ is added to the water-in-oil emulsion. To this emulsion is then added 7 g of Tergitol 15-S-9 (inverting surfactant) with stirring. The resulting emulsion is then tested for invertibility by the following procedure.

To a 473 ml bottle equipped with a three-bladed stirrer is added 300 g of an aqueous solution containing 3 percent NaCl and 0.05 percent $CaCl_2$. A 1.5 g portion of the aforementioned emulsion is then rapidly added to the bottle while stirring the solution at 400 rpm for 30 minutes. The viscosity of the resultant solution is measured using a Brookfield RVT viscometer using a No. 1 spindle and operating at 20 rpm and 25° C.

Several additional emulsions are prepared using different amounts of inverting surfactants and different inverting surfactants in accordance with the foregoing procedure. These emulsions are also tested for invertibility. The results of these tests are reported in Table I, Sample Nos. 1–12.

For purposes of comparison, several emulsions are prepared following the foregoing procedure except that all of the inverting surfactant is added subsequent to polymerization. These emulsions are similarly tested for invertibility and the results are reported in Table I, Sample Nos. $C_1$–$C_4$.

TABLE I

| Sample No. | Emulsifier (1) Type | Amt, % | Pre-Added Surfactant (2) Type | Amt, % | Post-Added Surfactant (3) Type | Amt, % | Invertibility (4), % |
|---|---|---|---|---|---|---|---|
| 1 | IPO | 2 | 15-S-9 | 1 | 15-S-9 | 2.5 | 51 |
|   | SMO | 2 |        |   |        |     |    |
| $C_1$* | IPO | 2 |     | 0 | 15-S-9 | 3.5 | 34 |
|   | SMO | 2 |        |   |        |     |    |
| 2 | IPO | 2 | 15-S-9 | 1 | 15-S-9 | 4.0 | 65 |
|   | SMO | 2 |        |   |        |     |    |
| $C_2$* | IPO | 3 |     | 0 | 15-S-9 | 5.0 | 20 |
|   | SMO | 2 |        |   |        |     |    |
| 3 | IPO | 2 | 15-S-9 | 1 | DN-14 | 2.0 | 77 |
|   | SMO | 2 |        |   |       |     |    |
| $C_3$* | IPO | 2 |     | 0 | DN-14 | 3.5 | <5 |
|   | SMO | 2 |        |   |       |     |    |
| 4 | IPO | 2 | 15-S-9 | 1 | DN-14 | 4.0 | >90 |
|   | SMO | 2 |        |   |       |     |     |
| $C_4$* | IPO | 2 |     | 0 | DN-14 | 6.0 | 58 |
|   | SMO | 2 |        |   |       |     |    |
| 5 | IPO | 2 | 15-S-9 | 0.2 | DN-14 | 4.8 | 74 |
|   | SMO | 2 |        |     |       |     |    |
| 6 | IPO | 2 | 15-S-9 | 0.5 | DN-14 | 4.5 | 82 |
|   | SMO | 2 |        |     |       |     |    |
| 7 | IPO | 2 | 15-S-9 | 2.0 | DN-14 | 3.0 | 96 |
|   | SMO | 2 |        |     |       |     |    |
| 8 | IPO | 2 | 15-S-5 | 1 | DN-14 | 4.0 | >90 |
|   | SMO | 2 |        |   |       |     |     |
| 9 | IPO | 2 | 15-S-7 | 1 | DN-14 | 4.0 | >90 |
|   | SMO | 2 |        |   |       |     |     |
| 10 | IPO | 2 | 15-S-12 | 1 | DN-14 | 4.0 | 60 |
|    | SMO | 2 |         |   |       |     |    |
| 11 | IPO | 2 | STO | 1 | DN-14 | 4.0 | 47 |
|    | SMO | 2 |     |   |       |     |    |
| 12 | IPO | 2 | DN-14 | 0.5 | DN-14 | 4.0 | >90 |
|    | SMO | 2 |       |     |       |     |     |

*Not an example of the invention.
(1) Weight percent of water-in-oil emulsifier based on total monomers wherein:
IPO — isopropanolamide of oleic acid
SMO — sorbitan monooleate
(2) Weight percent based on total monomers of inverting surfactant added to the water-in-oil emulsion prior to polymerization wherein:
15-S-9 - Tergitol 15-S-9 (HLB = 13.5)
DN-14 - alkyl polyether alcohol (Triton DN-14 sold by Rohm and Haas)
15-S-5 - polyethylene glycol ether of secondary alcohol (HLB = 10.5) (Tergitol 15-S-5 sold by Union Carbide)
15-S-7 - polyethylene glycol ether of secondary alcohol (HLB = 12.1) (Tergitol 15-S-7 sold by Union Carbide)
15-S-12 - polyethylene glycol ether of secondary alcohol (HLB = 14.5) (Tergitol 15-S-12 sold by Union Carbide)
STO — Sorbitan trioleate having 20 polyoxyethylene units (HLB = 11)
(3) Weight percent based on total monomers added to the water-in-oil emulsion after polymerization wherein 15-S-9 and DN-14 are as defined in (2).
(4) Invertibility is determined from the following equation:

$$\text{Invertibility} = \% \text{ inversion} = \frac{\eta \text{ sample} - \eta \text{ blank}}{\eta \text{ max.} - \eta \text{ blank}} \times 100$$

wherein $\eta$ sample is the Brookfield viscosity of the sample as determined by the procedure described hereinbefore, $\eta$ blank is the Brookfield viscosity of the aqueous solution containing 3 percent NaCl and 0.05 percent $CaCl_2$ and $\eta$ max. is the Brookfield viscosity of a control sample. This control sample is prepared by (1) adding 0.15 percent of polymer in emulsion form to deionized water containing 0.15 percent of inverting surfactant that is post-added in the preparation of the particular sample ($\eta$ sample), (2) stirring the control sample at 400 rpm for 30 minutes as described hereinbefore and (3) adding 3 percent NaCl and 0.15 percent $CaCl_2$. In each case viscosity is measured soon after preparation and then after standing overnight. In Sample Nos. 1–12, the viscosities develop more rapidly and to higher values when compared to $\eta$ max. In Sample Nos. $C_1$–$C_4$, the viscosities do not fully develop when compared to the values for $\eta$ max.

As evidenced by the data of Table I, samples in which a part of the inverting surfactant is added prior to polymerization (Sample Nos. 1–4) invert to a greater degree (percent of inversion) than when the entire amount of the inverting surfactant is added after polymerization as in Sample Nos. $C_1$–$C_4$.

What is claimed is:

1. A self-inverting, stable water-in-oil emulsion comprising (1) a discontinuous aqueous phase containing a water-soluble polymer which discontinuous phase is dispersed in (2) a continuous oil phase wherein the emulsion contains an inverting amount of an inverting surfactant and an emulsifying amount of a water-in-oil emulsifier, said emulsion having been prepared by polymerizing a water-in-oil emulsion of a water-soluble ethylenically unsaturated monomer containing a portion of the inverting surfactant and adding the remainder of said inverting surfactant to the resultant water-in-oil emulsion of water-soluble polymer subsequent to polymerization, said portion added prior to the completion of polymerization being a sufficient amount of a nonionic surfactant to increase the degree of inversion when the water-in-oil emulsion of water-soluble polymer is inverted into a continuous aqueous phase.

2. The emulsion of claim 1 wherein the emulsion is inverted into a continuous aqueous phase containing from about 0.001 to about 10 weight percent of a dissolved salt.

3. The emulsion of claim 1 wherein the polymer is polyacrylamide or a copolymer or acrylamide and acrylic acid.

4. The emulsion of claim 1 wherein the polymer is a copolymer of acrylamide and a water-soluble cationic comonomer.

5. The emulsion of claim 1 wherein the inverting surfactant is a water-soluble nonionic surfactant.

6. The emulsion of claim 5 wherein the surfactant is an alkyl polyethyleneoxy alcohol or an alkylphenoxy alcohol.

7. The emulsion of claim 6 wherein the surfactant has an HLB in the range from about 10 to about 14.

8. The emulsion of claim 1 wherein the portion of inverting surfactant added prior to polymerization is in the range from about 0.05 to about 5 weight percent based on the monomer weight.

9. The emulsion of claim 1 wherein the remainder of inverting surfactant added to the emulsion subsequent to polymerization is in the range from about 0.5 to 10 weight percent based on the monomer weight.

10. A process for preparing the water-in-oil emulsion of claim 1 which comprises (1) forming a stable water-in-oil emulsion (monomeric precursor) containing at least one water-soluble monomer in the aqueous phase which is dispersed in a continuous aqueous, phase said emulsion containing an emulsifying amount of a water-in-oil emulsifier and an amount of an inverting surfactant that is sufficient to increase the degree of inversion when the emulsion of water-soluble polymer is inverted; (2) subjecting the monomeric precursor to conditions sufficient to polymerize the monomer; and (3) adding a remaining amount of an inverting surfactant which will enable the water-in-oil emulsion of the polymer to invert upon the addition of sufficient water.

11. A process for inverting the water-in-oil emulsion of claim 1 which comprises dispersing the emulsion in a continuous aqueous phase such that the water-soluble polymer is intimately dispersed in said continuous aqueous phase.

12. The emulsion of claim 1 wherein the nonionic surfactant is an alkyl polyethyleneoxy alcohol represented by the formula: $R-(EO)_nH$ wherein R is $C_4-C_{20}$ alkyl, EO is ethyleneoxy and n is a number from 1 to 10.

13. The emulsion of claim 1 wherein the nonionic surfactant is a polyethylene glycol ether of a secondary alcohol.

14. The emulsion of claim 1 wherein the inverting surfactant is a polyethylene glycol ether of a secondary alcohol which is present in the amount from 3.5 to 5 weight percent and the emulsifier is a mixture of 2 weight percent of isopropanolamide of oleic acid and 2 weight percent of sorbitan monooleate, said percentages being based on the water-soluble monomer.

15. The emulsion of claim 14 wherein the monomer is a mixture of acrylamide and acrylic acid.

* * * * *